United States Patent
Haka

[19]

[11] Patent Number: 5,879,263
[45] Date of Patent: Mar. 9, 1999

[54] MULTI-SPEED POWER TRANSMISSION

[75] Inventor: Raymond James Haka, Brighton, Mich.

[73] Assignee: General Motors Corporation, Detroit, Mich.

[21] Appl. No.: 939,329

[22] Filed: Sep. 29, 1997

[51] Int. Cl.$^6$ ........................................ F16H 3/62
[52] U.S. Cl. .............................. 475/276; 475/281
[58] Field of Search .................... 475/275, 276, 475/277, 278, 281, 283, 285, 289, 292, 297

[56] References Cited

U.S. PATENT DOCUMENTS 5,069,656 12/1991 Sherman ........................ 475/276
5,588,929 12/1996 Benford ........................ 475/276

*Primary Examiner*—Charles A. Marmor
*Assistant Examiner*—Sherry Lynn Estremsky
*Attorney, Agent, or Firm*—Donald F. Scherer; Michael J. Bridges

[57] ABSTRACT

A five speed power transmission has a planetary gear arrangement comprised of three simple planetary gearsets and a plurality of clutches and brakes. The planetary gear arrangement is controlled to establish five forward gear ratios and a reverse gear ratio between the input and output shaft. One of the planetary gearsets is controlled to establish a reaction point or node for the fifth forward gear ratio.

4 Claims, 1 Drawing Sheet

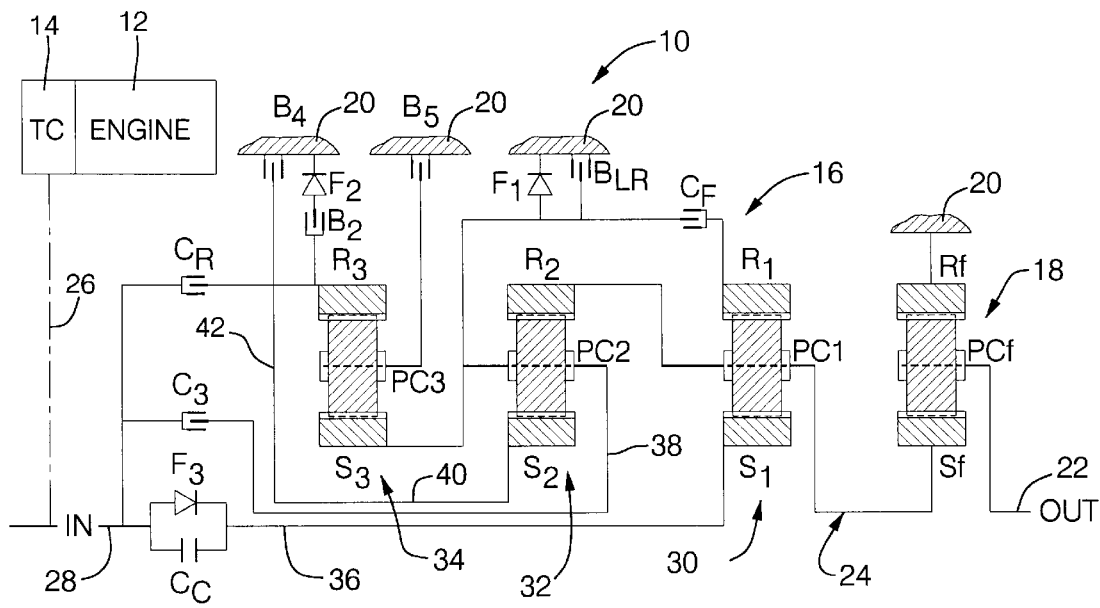
FIG. 1
| RATIO | $C_F$ | $C_3$ | $C_C$ | $C_R$ | $B_4$ | $B_5$ | $B_{LR}$ | $F_1$ | $F_2$ | $F_3$ | $B_2$ |
|---|---|---|---|---|---|---|---|---|---|---|---|
| 1 | X | | ⊗ | | | | ⊗ | X | | X | |
| 2 | X | | ⊗ | | ⊗ | | | | X | X | X |
| 3 | X | X | ⊗ | | | | | | | X | |
| 4 | | X | | | X | | | | | | |
| 5 | | X | | | | X | | | | | |
| R | | | | X | | | X | | | | |
FIG. 2
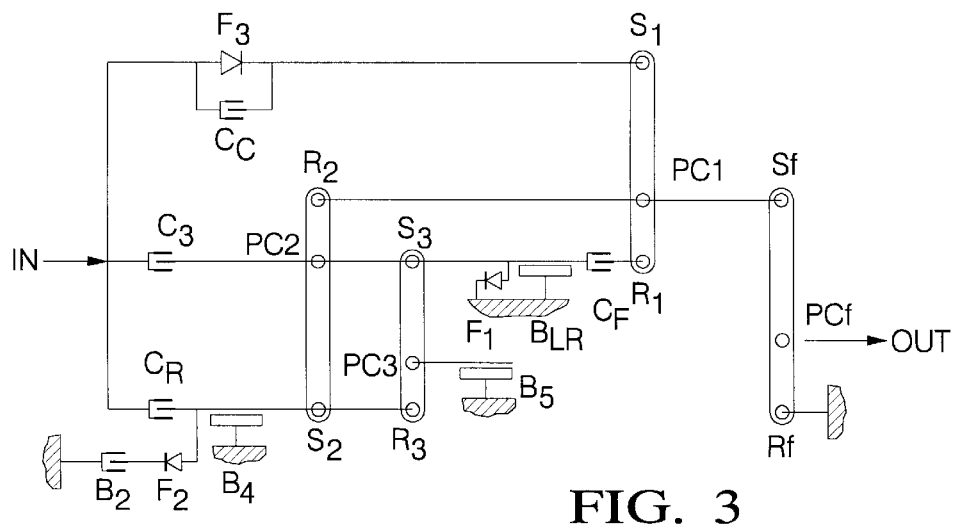
FIG. 3

5,879,263

MULTI-SPEED POWER TRANSMISSION

TECHNICAL FIELD

This invention relates to multi-speed planetary transmissions having a plurality of simple planetary gearsets.

BACKGROUND OF THE INVENTION

It is common practice to change a four speed planetary transmission to a five speed transmission by the addition of a planetary gearset at the input or output end of the four speed. The added gearset requires at least one clutch and one brake to provide the added ratio which may be either an underdrive or an overdrive.

SUMMARY OF THE INVENTION

It is an object of the present invention to provide an improved five speed planetary transmission.

In one aspect of the invention, an additional planetary gearset is incorporated into a four speed planetary gearset to provide a five speed planetary gearset.

In another aspect of the invention, only a friction brake is added to control the additional planetary gearset.

In yet another aspect of the invention, the added planetary gearset establishes a reaction point in the planetary gear arrangement for one of the forward ratios.

In still another aspect of the invention, the added planetary gearset transmits torque only in the highest forward gear ratio.

In still a further aspect of the invention, a ratio change between the fourth and fifth ratios involves a reaction member change in the planetary and the input and output members remain constant.

BRIEF DESCRIPTION OF THE DRAWINGS

FIG. 1 is a schematic diagram of a planetary transmission incorporating the present invention.

FIG. 2 is a chart describing the engagement state of the friction devices during operation of the transmission shown in FIG. 1.

FIG. 3 is a lever diagram of the planetary transmission shown in FIG. 1.

DESCRIPTION OF AN EXEMPLARY EMBODIMENT

Referring to the drawings, there is seen in FIG. 1 a powertrain generally designated 10, including an engine 12, a torque converter 14, a planetary gear arrangement 16 and a final drive arrangement 18. The final drive arrangement is a full planetary gearset having a sun gear SF, a ring gear RF and a planet carrier assembly PCF. The ring gear RF is continuously connected to a housing or stationary portion 20 of the transmission powertrain 10. The carrier assembly PCF is connected to a powertrain output shaft 22 while the sun gear SF is connected continuously with a transmission output shaft 24.

The torque converter 14 is connected via a conventional chain drive 26 to a transmission input shaft 28. The transmission input shaft 28 is drivingly connected with a one-way device F3, a selectively engageable friction clutch CC, a selectively engageable clutch C3 and another selectively engageable clutch CR. Each of the clutches and the other clutches and brakes which will be described later, are preferably of the hydraulically actuated type wherein a piston is actuated to cause the engagement of a plurality of friction plates or, in the case of brakes, the friction brake might be a band member which is operated through a pressurized servo to contract on a drum or other transmission component.

The planetary gear arrangement 16 includes three simple planetary gearsets 30, 32 and 34. The planetary gearset 30 includes a sun gear S1, a ring gear R1 and a carrier assembly PC1. The carrier assembly PC1 is continuously connected with the transmission output shaft 24. The planetary gearset 32 includes a sun gear S2, a ring gear R2 and a planet carrier assembly PC2. The ring gear R2 is continuously drivingly connected with the carrier assembly PC1 and therefore with the output shaft 24. The sun gear S1 of planetary gearset 30 is connected through a shaft 36 with the one-way device F3 and the friction clutch CC.

The carrier PC2 of planetary gearset 32 is connected through a shaft 38 with the clutch C3 and the sun gear S2 of the planetary gearset 32 is connected through a shaft 40 and hub 42 with the selectively engageable friction clutch CR and with a selectively engageable friction brake B4 which is effective to ground the sun gear S2 to the housing 20 when the brake is engaged.

The carrier PC2 is also operatively connected with a one-way device F1 with a selectively engageable friction brake BLR and with a selectively engageable clutch CF. The clutch CF is also connected with the ring gear R1 of the planetary gearset 30. Therefore, when the clutch CF is engaged, the ring gear R1 and carrier assembly PC2 rotate in unison. Whenever the brake BLR is engaged, the carrier assembly PC2 is restrained from rotation as is the ring gear R1 if the clutch CF is engaged. Also, the one-way device F1 prevents reverse rotation of the ring gear R1 when the clutch CF is engaged.

The planetary gearset 34 includes a sun gear S3, a ring gear R3 and a planet carrier assembly PC3. The sun gear S3 is continuously connected with the carrier assembly PC2 and therefore with the one-way device F1 and the brake BLR. The carrier assembly PC3 is connected selectively with the housing 20 through a friction brake B5. The ring gear R3 is selectively connectible to the housing 20 via the brake B4 or through a selectively engageable brake B2 and a one-way device F2.

The three planetary gearsets 30, 32 and 34 are simple planetary gearsets, that is, there is a single pinion mesh between the sun gears an ring gears of these planetarys. The number of pinion gears which are rotatably mounted on the carrier assemblies can be either three or four depending upon the torque requirements of the planetary transmission.

The chart shown in FIG. 2 describes the engaged condition or state of the friction devices and the operating state of the one-way devices during the drive ratios that are established within the transmission. To establish the first and lowest gear ratio, the clutch CF is engaged and the sun gear S1 is driven through the one-way device F3. With the rotation of the sun gear S1 the ring gear R1 attempts to rotate in reverse which is prevented by the one-way device F1, therefore resulting in a forward rotation of the carrier assembly PC1 and the output shaft 24.

This can be seen by looking at the lever diagram described in FIG. 3, if one visualizes the link comprised of S1, PC1 and R1, it can be determined that the input lever arm is from S1 to R1 and the output lever arm is from R1 to PC1, such that an underdrive ratio is achieved.

To establish the second forward gear ratio, the brake B2 is engaged thereby providing a connection between the ring gear R3 and sun gear S2 with the housing 20. In this condition, the sun gear S2 and ring gear R2 are held stationary in the reverse direction of rotation. Again, looking at the lever diagram in FIG. 3, it will be noted that the input lever is from S1 to S2 and the output lever is from S2 to PC1. Thus, the second ratio is an underdrive ratio which provides a higher output speed for a given input speed than was available in the first and lowest gear ratio.

To establish the third forward gear ratio, the clutch C3 is engaged such that the ring gear R1 and sun gear S1 are both driven at input speed in a 1:1 ratio resulting in a direct drive from the input shaft 28 to the output shaft 22.

To establish the fourth forward gear ratio, the brake B4 is engaged. Also, in this condition, the clutch CF can be disengaged if desired and that is the preferable state of execution for that friction device. With the brake B4 engaged, the sun gear S2 is a reaction point and the carrier PC2 is an input member through the engagement of the clutch C3. Again, looking at the lever diagram in FIG. 3, it is obvious that if the reaction point is S2 and the output is R2, the input lever is between PC2 and S2 while the output lever is between R2 and S2, resulting in an overdrive ratio at the output member R2 and PC1 of the planetary gear arrangement 16. Thus, fourth gear is an overdrive gear.

In the fifth and highest forward gear ratio, the brake B5 is engaged and the brake B4 is disengaged. Also, as in the fourth ratio, the clutch CF is preferably disengaged. With the brake B5 engaged, the planetary gearset 34 becomes a member of the power pack. The carrier assembly PC3 is grounded and therefore becomes a reaction member within the planetary gear arrangement 16.

As can be seen in FIG. 3, the node PC3 is introduced into the linkage such that the lever arm R2, S3, PC3 is active. The point PC3 is the reaction point in the lever arm and therefore the input lever is from PC2 to PC3 or from S3 to PC3 which is the same element for all intents and purposes from a lever diagram standpoint. The output lever arm is from PC3 to R2 and, as will be apparent to those skilled in the art, the input lever arm being shorter in fifth gear than in fourth gear, will result in a higher overdrive ratio than was available in the fourth gear ratio.

It should be evident now to those skilled in the art after reading the above description that the added planetary gearset 34 establishes a reaction point within the planetary gearset 32 which produces an overdrive ratio higher than the ratio produced by the planetary gearset 32 alone. Also, from the above description, it should be noted that the input member PC2 is the same in fourth gear and fifth gear and the output member R2 is the same in fourth gear and fifth gear.

From a lever diagram standpoint, as shown in FIG. 3, the point PC3 can be translated to the lever arm R2, PC2, S2. Because of the translated position of the input PC2 and the previous reaction S2, the fifth gear overdrive ratio will result in a faster output speed for the given input speed than was available in the fourth gear ratio which utilizes the planetary gearset 32 by itself, as represented by the lever R2, PC2, S2.

Further, it should be appreciated that this added gear ratio is accomplished with the addition of only one friction device; namely, brake B5. The prior art devices which add a planetary gearset to provide an additional overdrive ratio add both a clutch and brake unit. The brake unit establishes the overdrive ratio and a clutch unit provides a 1:1 ratio. The planetary gearset is added either to the input end or the output end of the transmission and not in a reaction position as described above for the present invention.

I claim:

1. A power transmission comprising:
an input shaft;
an output shaft;
a first simple planetary gearset having a first sun gear, a first ring gear and a first carrier assembly continuously connected with said output shaft;
a second simple planetary gearset having a second sun gear, a second carrier assembly and a second ring gear continuously connected with said output shaft;
a third simple planetary gearset having a third sun gear continuously connected with said second carrier assembly, a third ring gear continuously connected with said second sun gear and a third carrier assembly;
a first one-way means operatively connecting said input shaft with said first sun gear;
a second one-way means operatively connecting said second carrier assembly with a stationary portion of the power transmission;
a serially arranged first selectively engageable friction drive means and a third one-way means operatively connecting said second sun gear with said stationary portion;
a second selectively engageable friction drive means selectively interconnecting said first ring gear and said second carrier assembly;
a third selectively engageable friction drive means selectively connecting said second carrier assembly with said stationary portion;
a fourth selectively engageable friction drive means selectively connecting said second sun gear with said stationary portion;
a fifth selectively engageable friction drive means selectively connecting said second carrier assembly with said input shaft;
a sixth selectively engageable friction drive means selectively connecting said second sun gear with said input shaft; and
a seventh selectively engageable friction drive means selectively connecting said third carrier assembly with said stationary portion.

2. The power transmission defined in claim 1 wherein; the power transmission selectively provides five forward gear ratios including a lowest ratio and a highest ratio and one reverse ratio and wherein said third planetary gearset transmits torque only when the highest ratio of the gear ratios is selected.

3. The power transmission defined in claim 2 wherein; said fifth selectively engageable friction drive means is engaged during the highest gear ratio and a penultimate gear ratio, said seventh selectively engageable friction drive means is engaged during said highest gear ratio and said fourth selectively engageable friction drive means is engaged to establish the penultimate gear ratio.

4. The power transmission defined in claim 1 where; said first one -way means is effective to transmit drive torque during first, second and third forward gear ratios and said fifth selectively engageable friction drive means is effective to transmit drive torque during fourth and fifth forward ratios and said third forward ratio; an eighth selectively engageable friction drive means is selectively engageable between said input shaft and said first sun gear in parallel drive relation with said first one-way means to transmit torque during a coast condition.

* * * * *